June 19, 1962     T. I. ANDREWS     3,039,140
APPARATUS FOR MANUFACTURING PIPE INSULATION
Filed Feb. 8, 1960     2 Sheets-Sheet 1
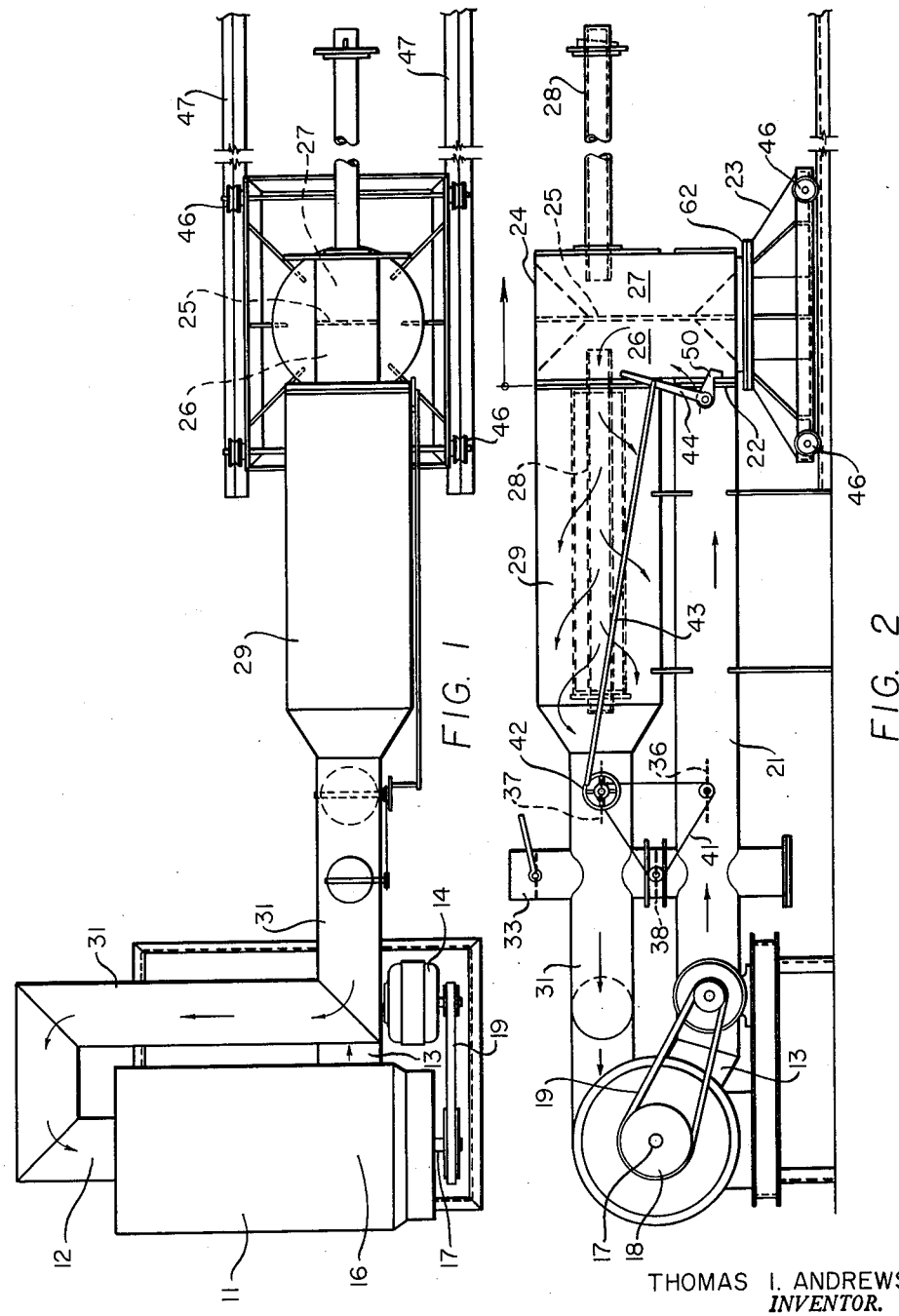
THOMAS I. ANDREWS
*INVENTOR.*
BY
*Flehr and Swain*
ATTORNEYS June 19, 1962 T. I. ANDREWS 3,039,140
APPARATUS FOR MANUFACTURING PIPE INSULATION
Filed Feb. 8, 1960 2 Sheets-Sheet 2

THOMAS I. ANDREWS
*INVENTOR.*

BY
ATTORNEYS

United States Patent Office 3,039,140
Patented June 19, 1962

3,039,140
APPARATUS FOR MANUFACTURING PIPE
INSULATION
Thomas I. Andrews, Los Altos Hills, Calif., assignor to
Durant Insulated Pipe Company, Palo Alto, Calif., a
corporation of California
Filed Feb. 8, 1960, Ser. No. 7,417
2 Claims. (Cl. 18—6)

This invention relates to an apparatus for manufacturing pipe insulation and more particularly to an apparatus suitable for forming glass fiber pipe insulating jackets.

Pipes are generally insulated by employing preformed or precast sections of insulation which are assembled on the pipe and strapped together by wires, bands, clips and the like to hold the sections in place on the pipe. It is desirable to provide an insulating jacket which is cylindrical in form and does not require the various bands, clips and the like which are time-consuming in application. Further, when putting together sections of insulation of the prior art type, care must be exercised so that seams which reduce the thermal efficiency of the insulation are not present.

In copending application Serial No. 797,256, filed March 4, 1959, there is described a pipe insulation which is in the form of one or more layers of blanket insulation which includes a binder. The complete assembly is then treated to cause the binder to set and form a homogeneous, porous, relatively stiff insulating jacket.

According to the method described in said copending application, the insulation is formed by wrapping a pipe with one or more turns of impregnated glass fiber blanket insulation. The wrapped material is then subjected to a heat operation to assure that the resin binder is set and that a layer of homogeneous insulation is formed.

It is an object of the present invention to provide an apparatus suitable for curing resin-impregnated cylindrical insulation.

It is another object of the present invention to provide a manufacturing apparatus in which hot gases are circulated for curing and circulating means therefor.

It is another object of the present invention to provide a curing oven which includes a furnace and means for circulating hot gases selectively from the furnace through the impregnated glass fiber or to bypass the curing region.

It is another object of the present invention to provide a furnace which includes a furnace region and a curing region, means for continuously circulating hot gases, and means for selectively circulating the hot gases through the curing region or diverting the same from the curing region as they are continuously circulated through the furnace region.

These and other objects of the invention will become more clearly apparent from the following description when taken in conjunction with the accompanying drawing.

Referring to the drawing:

FIGURE 1 is a plan view of apparatus in accordance with the present invention;

FIGURE 2 is a side elevational view of apparatus in accordance with the present invention;

Figure 6:
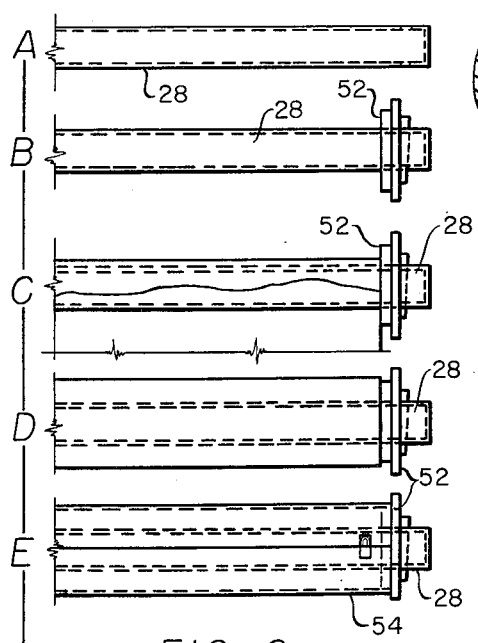
Figure 7:
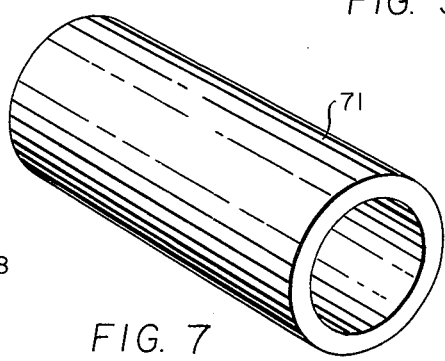

FIGURES 6A–E show the steps in applying the insulation in accordance with the present invention; and FIGURE 7 shows the finished product.

Referring to FIGURES 1 and 2, the apparatus includes a furnace region 11 in which a fuel such as natural gas is combusted to provide heat. Heated gases are withdrawn from the outlet 13 and circulated to the inlet 12. A motor 14 serves to drive a blower which is located in the region 16 of the furnace (such blower not being shown). The motor drives the blower through the shaft 17 which carries a pulley 18 engaged by the belt 19 extending between the motor 14 and blower. The blower serves to withdraw hot gases from the furnace 11 and blow the same into the outlet 13 connected to the conduit 21. The end 22 of the conduit 21 is adapted to cooperate with the carriage 23 which serves to carry mandrels on which the insulation is wrapped, as will be presently described.

The carriage 23 includes a housing 24 which has a partition wall 25 forming two chambers 26 and 27. The end of the pipe 22 is placed in communication with chambers 26 or 27 depending upon the orientation of the carriage. Each of the chambers communicates with the interior of a hollow mandrel 28 carried thereon. With the carriage 23 seated against the pipe, a mandrel 28 is disposed within a curing region 29 of the apparatus. The other end of the curing region 29 is connected to the pipe 31 which, in turn, communicates with the inlet to the furnace. Thus, there is a complete, closed loop between the blower, through the mandrel and return to the furnace.

It is apparent that when the carriage is removed from seating engagement with the pipe 21 and the curing region 29 that the hot gases would escape. However, a bypass system is provided so that the gases are bypassed when the carriage is removed. Thus, a bypass pipe 33 connects the pipes 21 and 31 as shown. Each of the pipes 21, 31 and 33 is provided with a valve means 36, 37 and 38, respectively. The valve means 36, 37 and 38 include driving pulleys which are interconnected by a chain drive 41 so that the valves are operated in unison. A crank 42 is associated with the valve 37 and connected by the link 43 to the handle 44. The handle 44 may be connected to a lock 50 which is employed to lock the carriage to the pipe 21 and curing region 29. Thus, as the carriage is locked thereto, the lever 43 is drawn to the right as shown in the figures thereby opening the valves 36 and 37 and closing the valve 38 to provide a circulating path through the chamber 26 as previously described.

When the carriage is released by urging the handle 44 counter-clockwise, the rod 43 is urged to the left as viewed in the figure and the valves are rotated to thereby close the valves 36 and 37 and open the valve 38 whereby the gases are bypassed through the pipe 33 without escape at the end. The carriage may then be moved to the right as viewed in the figures and the treated insulation removed as will be presently described.

The carriage includes spaced rollers 46 which are adapted to ride on parallel rails 47. The carriage, as previously described, includes a pair of chambers 26 and 27 and associated with each of the chambers is a mandrel 28 of predetermined diameter. The diameter is dependent upon the interior diameter of the insulation desired.

Figure 3:
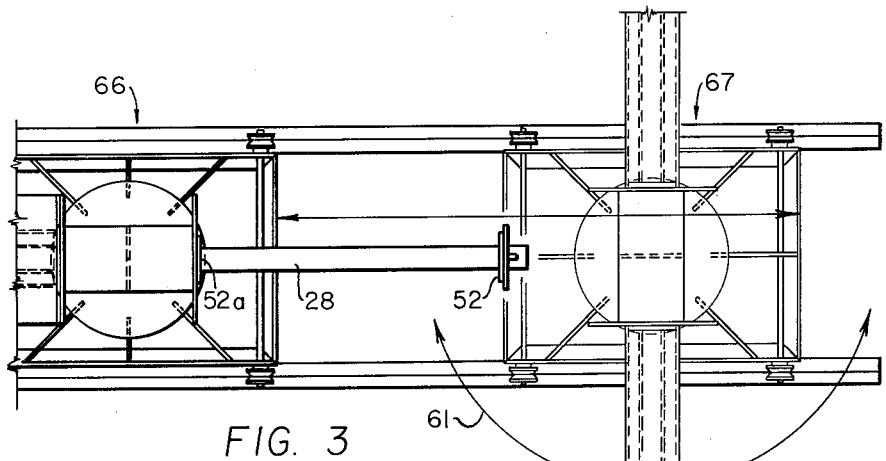
FIGURE 3 shows a loading carriage in loading and curing positions.
Figure 4:
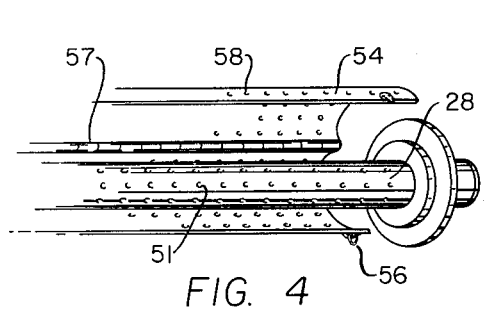
FIGURE 4 is a view showing the insulation receiving mandrel and jacket therefor.
Figure 5:
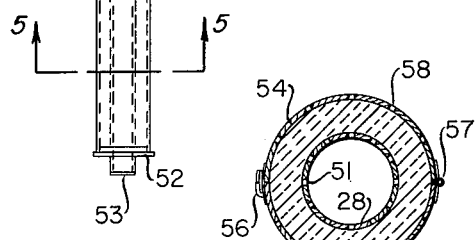
FIGURE 5 is a sectional view showing the mandrel with jacket applied and insulation disposed on the mandrel.

Referring particularly to FIGURES 3, 4 and 5, operation of the carriage and mandrels is described. Each of the mandrels 28 comprises an elongated tube with a plurality of perforations 51. Spaced from each of the ends of the mandrels are collars 52 and 52a which serve to define the length of the cylindrical insulation formed. The end of the mandrel is sealed off by a plate 53 whereby gases entering the mandrel escape outwardly through the ports 51 formed therein.

Referring to FIGURE 6, the steps in applying the insulation to the mandrel are illustrated. The collar 52 is first applied to the end of the mandrel 28. The blanket insulation is then wound onto the mandrel with one or more turns of insulation being applied. If the width of the insulation is less than the length of the mandrel, it may be convenient to apply several blankets in side-by-side relationship and to wind the same onto the pipe simultaneously. After a predetermined number of convolutions of blanket fiber insulation are applied to give the desired thickness and packing density, a jacket 54, FIGURES 4 and 5, is applied and clamped by means of the clamps 56. The jacket is formed in two portions which are hinged at 57 whereby it may be opened, placed over the insulation and then clamped. The jacket also includes a plurality of perforations 58 which allow passage of hot gases. The carriage is then rotated as indicated by the arrow 61 in FIGURE 3 and moved so that the insulation is inserted into the curing region.

When the carriage is in place, the valves 36, 37 and 38 are activated to direct the gases through the mandrel outwardly through the insulation and the ports formed in the jacket. Thus, the complete insulation is uniformly subjected to hot gases which rapidly cure the same.

Referring particularly to FIGURE 2, it is noted that while insulation is being cured within the curing region 29, the other mandrel is exposed. Thus, as the insulation in the region is being cured, the outside mandrel may be wound with additional insulation so that once the insulation being cured, the carriage may be rotated on the rotatable base 62 and the complete carriage moved to insert the new assembly. Referring to FIGURE 3, the carriage is illustrated in position 66 within the chamber, and position 67 without the chamber, being rotated for placement in the same.

Thus, a cycle of operation would include winding the external mandrel while the other one is being cured. When the insulation within the region 29 is cured, the carriage is moved outwardly, the complete assembly rotated, and the exterior mandrel inserted for curing. After a predetermined period of time, the outside mandrel will then be cooled; the end collar 52 which is removably secured to the mandrel is removed; and the insulation slid off to form a cylindrical insulation shown at 71, FIGURE 7.

The resulting insulation is a porous, fibrous insulation in which the individual glass fibers are united to one another as well as the various convolutions to form a homogeneous, relatively thick cylindrical insulating jacket.

It is observed that the overall apparatus is relatively simple in construction and yet provides means whereby insulation may be formed at a rapid rate. A minimum of time is lost since, as insulation is being cured in the furnace, new insulation may be added to the exterior mandrels. If desired, it is possible to provide a carriage with more than two chambers and associated mandrels whereby many mandrels may be pre-loaded for insertion into the drying oven. The curing time can be easily controlled by controlling the temperature of the furnace and the velocity of circulation of the gases. Alternatively, the mandrels may be removable whereby they may be pre-wound and placed on the carriage as soon as a mandrel including the cured insulation is removed.

I claim:

1. Apparatus for manufacturing insulated pipe comprising a heater having an intake and an exhaust manifold, a curing region in communication with one of said manifolds, a movable chamber, means for selectively placing said movable chamber in and out of communication between said curing region and the other of said manifolds, locking means for retaining said movable chamber in said communication, means responsive to the disengagement of said locking means for selectively communicating between both of said manifolds to bypass said curing region, and means connected to said chamber for holding a piece of pipe within said curing region when the chamber is in communication between the curing region and the other manifold.

2. Apparatus as defined in claim 1 wherein said movable chamber includes a hollow perforated mandrel, the inside of said mandrel being in communication with the interior of said chamber at the point of communication of said chamber to the curing region, said curing region being disposed to receive said mandrel with said movable chamber in communication with said curing region.

References Cited in the file of this patent

UNITED STATES PATENTS

| | | |
|---|---|---|
| 821,591 | Holmes et al. | May 22, 1906 |
| 1,148,117 | Neuman | July 27, 1915 |
| 2,101,921 | Shaver | Dec. 14, 1937 |
| 2,160,633 | Young | May 30, 1939 |
| 2,322,757 | Ward | June 29, 1943 |
| 2,334,930 | Huddle | Nov. 23, 1943 |
| 2,346,852 | Hutchinson | Aug. 29, 1944 |
| 2,428,653 | Collins | Oct. 7, 1947 |
| 2,434,690 | Ferla | Jan. 20, 1948 |
| 2,483,709 | Jean-Felix Paulsen | Oct. 4, 1949 |
| 2,528,643 | Dubbs | Nov. 7, 1950 |
| 2,589,390 | Hurt | Mar. 18, 1952 |
| 2,778,405 | Stephens et al. | Jan. 22, 1957 |

FOREIGN PATENTS

| | | |
|---|---|---|
| 557,665 | Canada | May 20, 1958 |
| 570,945 | Canada | Feb. 17, 1959 |